July 23, 1946.  E. ROLKER  2,404,460

ARTICLE HANDLING APPARATUS

Filed Jan. 15, 1943  5 Sheets-Sheet 1

Inventor
Edwin Rolker.
By Cushman, Darby & Cushman
Attorneys

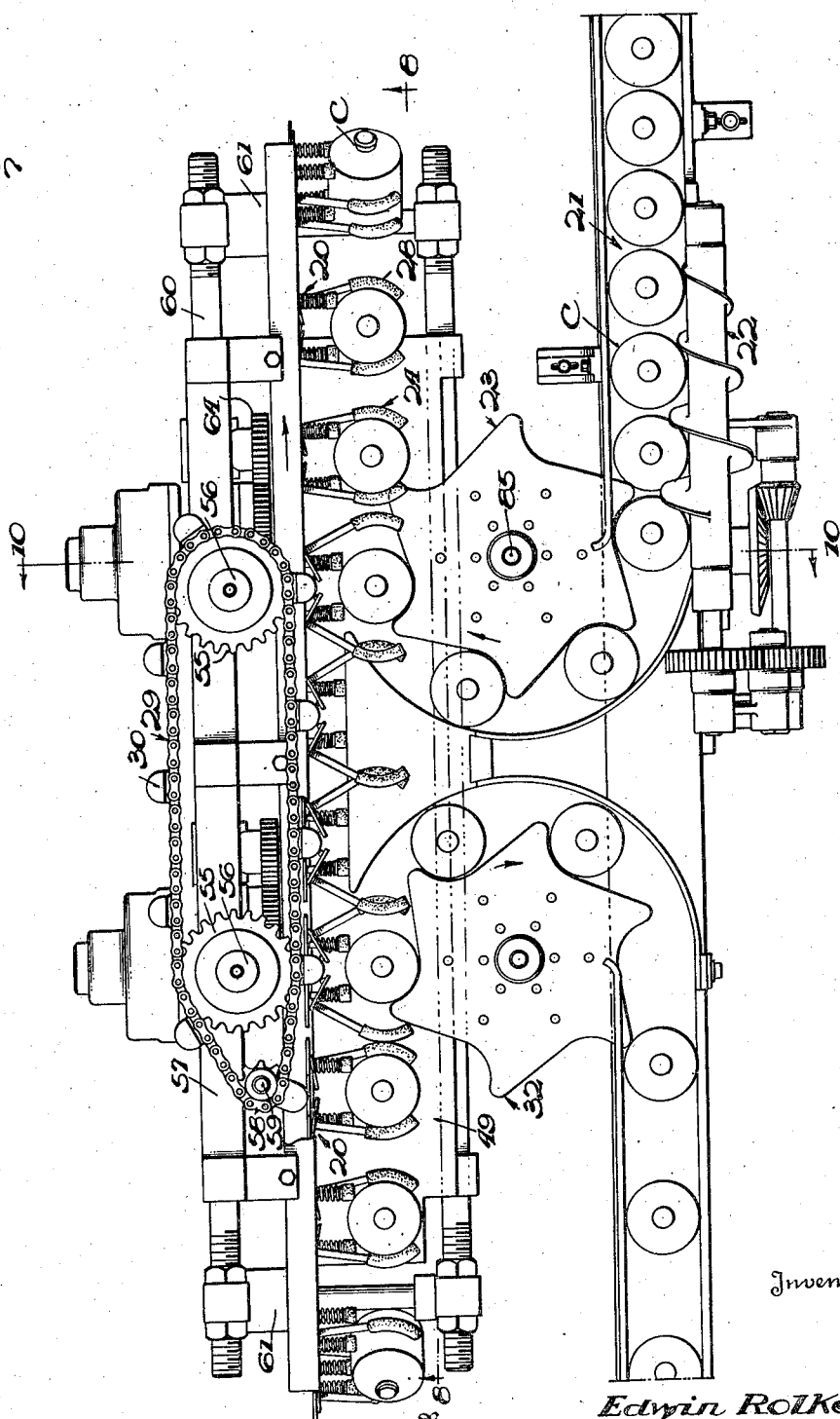

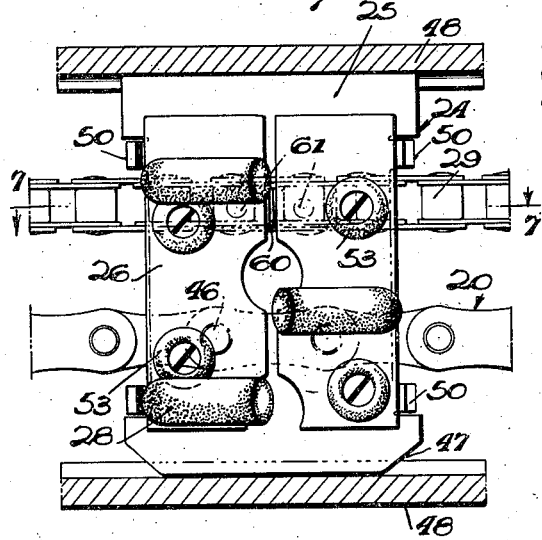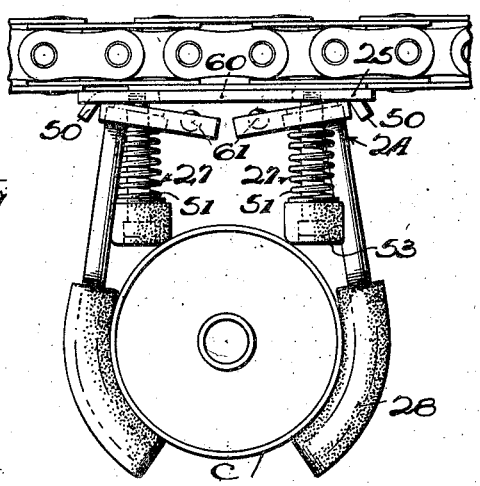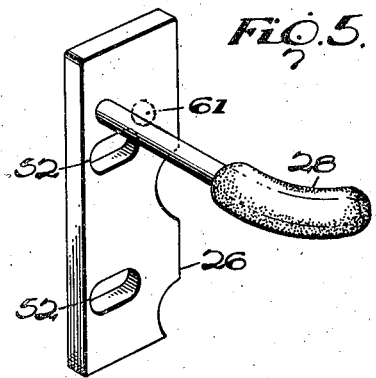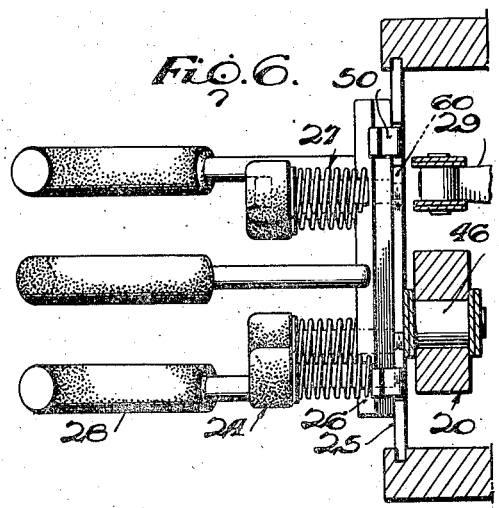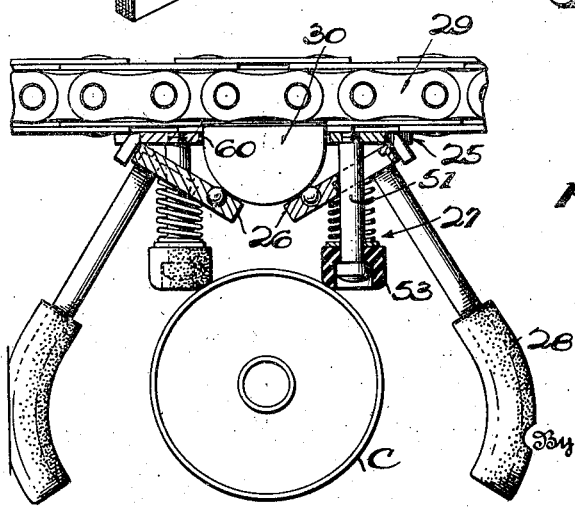

July 23, 1946.  E. ROLKER  2,404,460
ARTICLE HANDLING APPARATUS
Filed Jan. 15, 1943   5 Sheets-Sheet 4
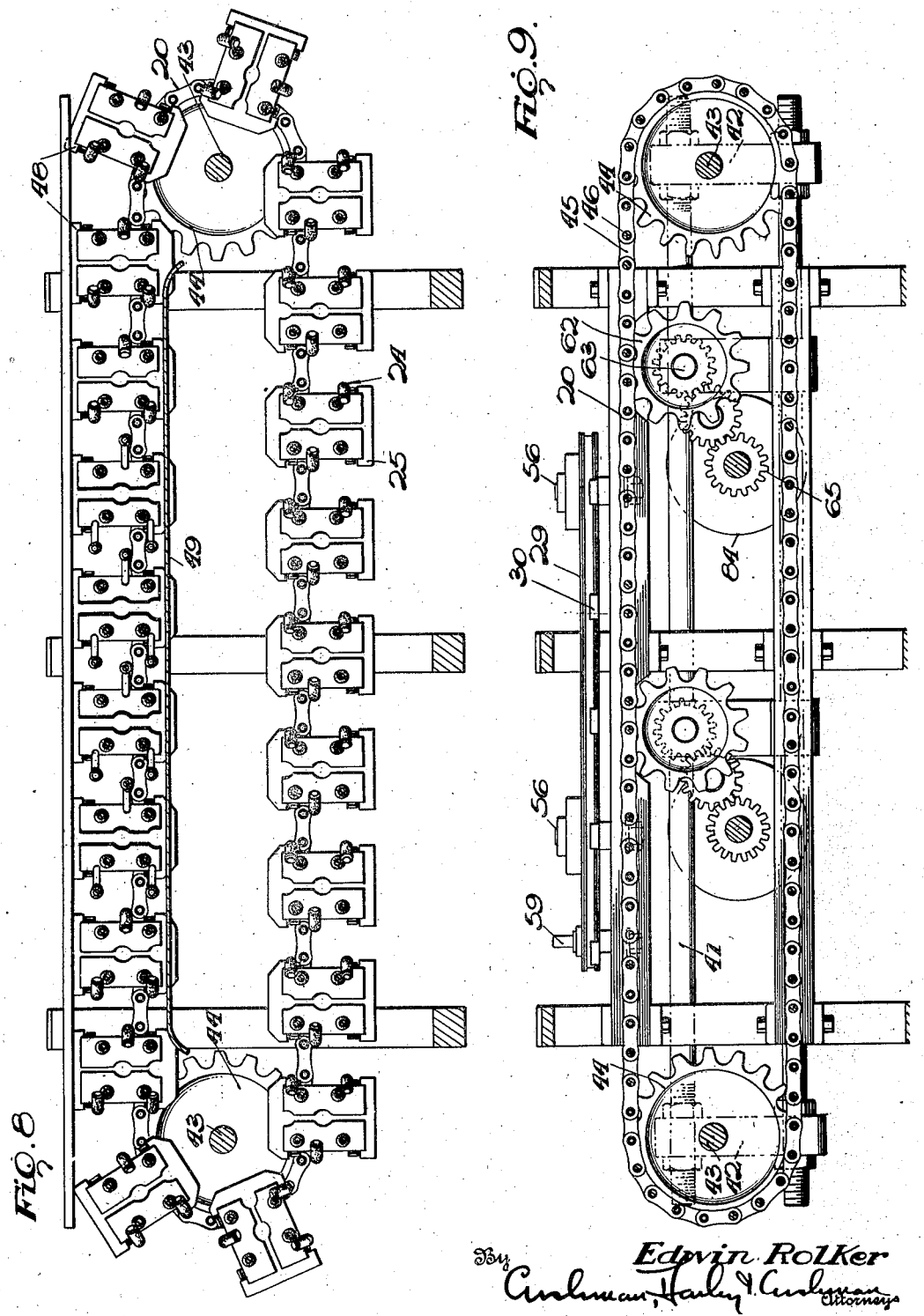
Edwin Rolker
By Cushman, Harley & Cushman
Attorneys July 23, 1946.  E. ROLKER  2,404,460
ARTICLE HANDLING APPARATUS
Filed Jan. 15, 1943   5 Sheets-Sheet 5
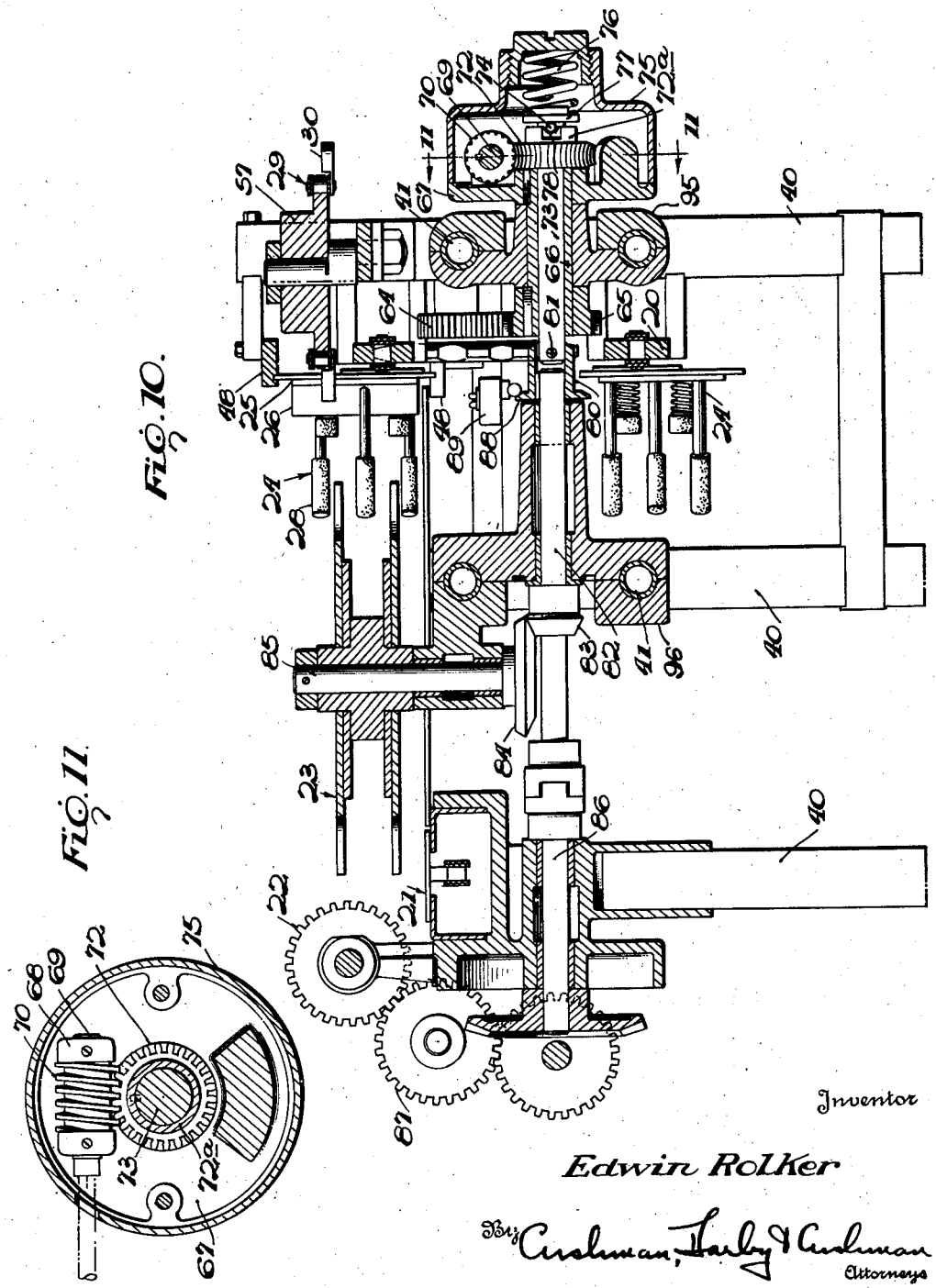

Patented July 23, 1946

2,404,460

UNITED STATES PATENT OFFICE 2,404,460

ARTICLE HANDLING APPARATUS

Edwin Rolker, Baltimore, Md., assignor to Crown Cork & Seal Company, Inc., Baltimore, Md., a corporation of New York Application January 15, 1943, Serial No. 472,505

16 Claims. (Cl. 198—179)

The present invention relates to article handling apparatus.

An important object of the invention is to provide a conveyor which will grip articles to support them in every possible position which the conveyor may assume.

It is necessary in numerous plants to move articles upon the upper run of a conveyor, then around the end of that run and along a lower run. Heretofore, this has been accomplished by means of a conveyor equipped with drags or pockets and having its ends and lower run enclosed by a frame or other form of casing which holds the articles against dropping, the drags or pockets being relied upon to advance the articles. However, unless the drags or pockets are of a form to exactly fit about each article, and the casing is so shaped as to closely engage each article, such an arrangement cannot be relied upon to firmly hold the articles in a definite position with respect to the conveyor. Obviously, if the drags or pockets and casing are designed to closely engage a particular article, the structure cannot be used for articles of other shapes or sizes. Furthermore, whenever a stationary casing element is relied upon to hold an article upon or against a conveyor, regardless of whether the article is held in a definite position, the article must be dragged along the stationary casing. If the article is of a type which would be damaged by any scratching which might result from this dragging, a casing arrangement is altogether undesirable.

In some instances, articles are held in a desired position with respect to a conveyor by having the article simultaneously engaged by the opposed run of a second conveyor. Such an arrangement is not economical of either space or cost and, in addition, cannot be readily adjusted to handle articles of different types and sizes.

Another object of the invention is to provide a conveyor which will grip articles and move them in any position without their being scratched or otherwise marred.

A further object is to provide an article gripping means which will firmly hold articles of numerous sizes and shapes upon conveyors without the necessity of any adjustment of the conveyor or gripping means.

It is necessary in some plants to move articles vertically, for example, from one floor to another. The arrangements ordinarily used for this purpose comprise a conveyor of the drag type to lift the articles. In order to move the articles downwardly, either a second drag type conveyor is provided or the articles are moved downwardly along a chute. If two drag conveyors are used, space requirements and costs are increased and the same is true if a lifting type drag conveyor and a chute are used. In addition, if a chute is used there is the possibility of scratching the articles.

An important object of the present invention is to provide a conveyor of such design that one run thereof may be used for lifting articles while the other run may be used for moving articles downwardly.

The conveyor of the present invention is so constructed that articles can be placed thereon and moved upwardly on one run and then brought downwardly along a return run. In addition, its construction is such that if an operation is to be performed upon the article at any point along the travel of the conveyor, the article can be removed from the conveyor and moved to the machine which is to operate thereon, for example, a machine to fill a container article, and then the article can be returned to the conveyor and carried to a further point or returned to the point of origin.

In accordance with the above, a further object of the invention is to provide a means for operating the gripping devices of an article gripping conveyor and which operating means can be positioned at any point along the path of travel of the conveyor to operate the gripping devices to either article gripping or article releasing position.

A further object of the invention is to provide a gripper operating means which is of such form that it will not impede the operation of the conveyor element and wherein the conveyor and gripper operating means are of such construction that neither can be broken by the contact of one with the other.

The gripper operating means included in the present invention and the grippers carried by the conveyor are of such design that no parts thereof have a sharp or sudden impact with each other. The invention thereby avoids objections to the use of gripping devices operated by impact with a fixed trip. The gripper operating means of the present invention moves with the conveyor element so that the operating means and the conveyor element cannot have any sudden contact with each other. It will be noted that the gripper operating means need only extend along the portion of the conveyor element path at which the gripping elements are to be operated. That is, the gripper operating means need not be coextensive with the conveyor element.

Another object of the invention is to provide an arrangement whereby an article delivering or removing mechanism may be maintained in synchronism with a conveyor regardless of the position of such mechanism with respect to the point from which the conveyor is driven.

Whenever articles are to be placed upon an article gripping conveyor or any conveyor provided with definitely located article supports, it is necessary that the article feeding mechanism be operated in exact synchronism with the conveyor. This is usually accomplished by driving the conveyor and the article feeding mechanism from a common source of power. Some difficulties may arise from such an arrangement if the feeding mechanism is positioned at a point along the path of travel of the conveyor which is distant from the source of power, since any stretching of the conveyor may cause the feeding mechanism to be out of synchronism. However, this can usually be adjusted for if the feeding mechanism is to be always maintained at the same point with respect to the conveyor.

The present invention contemplates that the feeding device may be positioned at any desired point along the course of the conveyor in accordance with the requirements of the plant in which the apparatus is positioned and some of these points may be at a substantial distance from the driving point for the conveyor. For this reason, the invention includes a driving connection between an article feeding means and a conveyor whereby the former can be driven from an adjacent portion of the conveyor. By this arrangement, the feeding mechanism will be positively maintained in synchronism with the adjacent portion of the conveyor once the article feeding device is installed. In addition, the necessity of extensive shafting to drive an article feeding means from a distant source of power is eliminated.

It will be understood that while the above object and structure has been discussed in connection with article feeding means, it is likewise applicable to article removing means or other devices to be synchronized with a conveyor.

A further object of the invention is to provide a drive connection between a conveyor element and an article delivering or removing means which will cause the apparatus to be stopped in the event that articles become jammed at the delivery or removing points.

The above-mentioned stopping mechanism includes an arrangement to disengage the drive between the conveyor and the article delivering and removing means before damage can occur from a jammed article. The invention includes a readily operable mechanism to enable the drive to again be synchronized.

A still further object of the invention is to provide an arrangement including the conveyor of the present invention which will enable containers to be washed and drained.

In the filling of metal containers it is highly desirable that the containers be washed before they are filled, just as is the case with glass containers. Glass containers are always washed and then inspected for foreign matter before they are filled. While metal containers are always new material, dust or other foreign material may settle therein during shipment between the manufacturing plant and the filling plant. Since the interiors of metal containers are not subject to a visual inspection, it is highly desirable to thoroughly wash each such container before it is filled and then take such action as is necessary to drain the washing liquid from the container.

By the present invention, the conveyor structure included herein may be used to move metal containers beneath a jetting device which will flow a stream of water into the container while it is upright and then invert the container to drain the water therefrom. The container can be held in an inverted position for such time as is necessary to enable all of the water or other washing liquid to be thoroughly drained and can then be restored to upright position in readiness for the filling operation.

A further object of the present invention is the provision of a conveyor structure whereby articles can be maintained in spaced relation to each other.

A still further object is the provision of a conveyor which will move articles in exactly spaced relation and which is capable of handling articles of different sizes and shapes.

It is frequently desirable to move articles on a conveyor in exactly spaced relation and a conveyor which will grip articles is particularly efficient for this purpose, since the articles can be moved through any plane without varying their spacing. However, one difficulty of article gripping conveyors is that they will handle an article of but one size or shape. As has been stated above, the conveyor structure of the present invention is of such design that it will handle numerous size or shapes of articles and maintain all of them on spaced centers without any adjustment of the gripping means. As a result, the conveyor structure can be used to move articles of different sizes or shapes to a mechanism which will perform an operation upon the article at a fixed point. The conveyor of the present invention can also be used to move articles to a desired transfer point in spaced relation.

Other objects and advantages of the invention will be apparent from the following specification and accompanying drawings.

In the drawings:

Figure 2 is a top plan view of a portion of the apparatus.

Figure 3 is a fragmentary view showing an article gripping device in front elevation.

Figure 4 is a top plan view of an article gripping device.

Figure 5 is a detail perspective showing one gripper of a gripping device.

Figure 6 is a side view of a gripping device showing the manner in which it is supported and guided.

Figure 7 is a horizontal sectional view on the line 7—7 of Figure 3 but showing the gripping device operated to opened position.

Figure 8 is a vertical sectional view on the line 8—8 of Figure 2.

Figure 9 is a view similar to Figure 8 but with the gripping devices omitted.

Figure 10 is a transverse vertical sectional view on the line 10—10 of Figure 2, and Figure 11 is a vertical sectional view on the line 11—11 of Figure 10.

Figure 1:
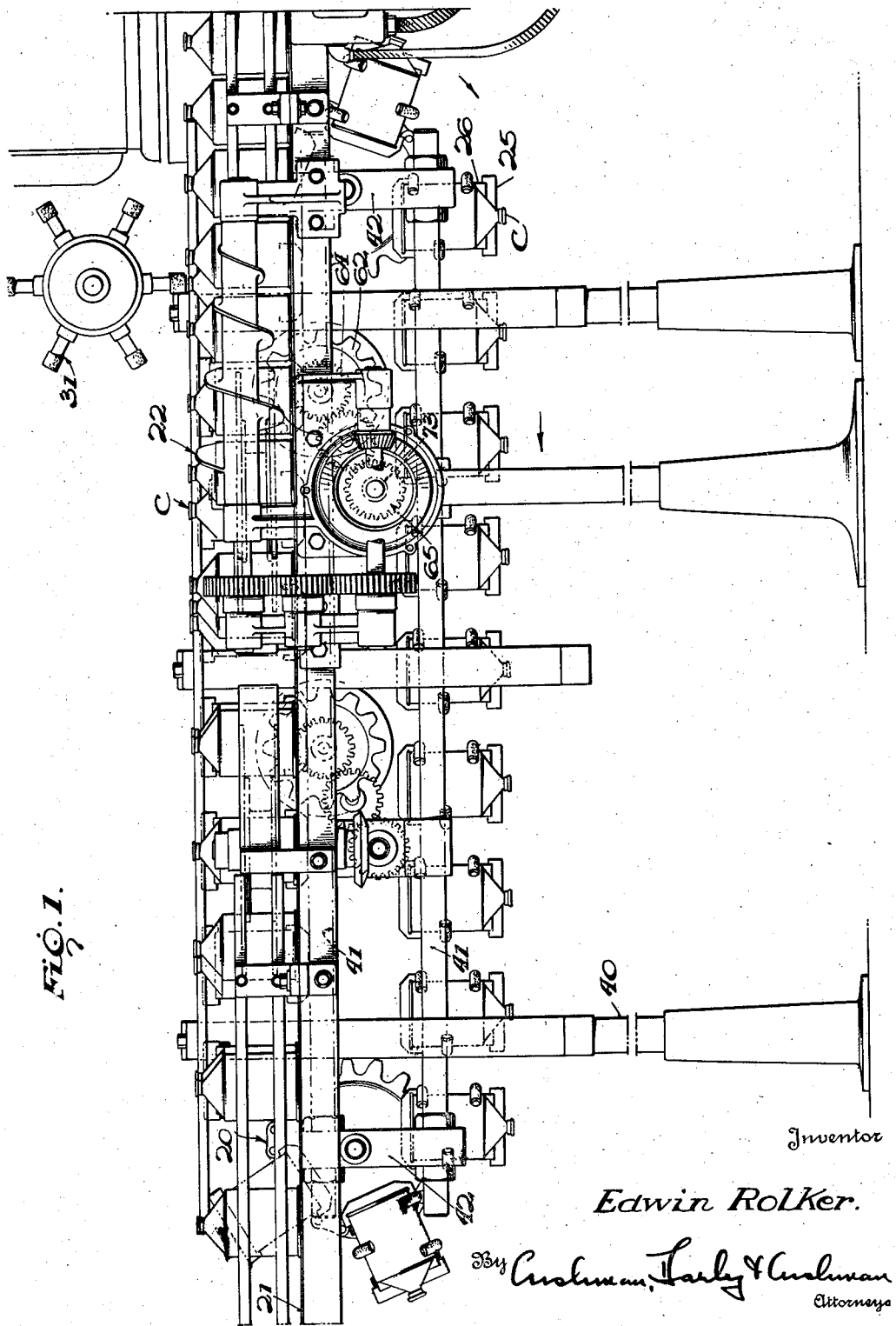
Figure 1 is a front elevation of the apparatus of the invention.

As has been stated above, the conveyor of the present invention may be used to move articles to and from various points in a plant and may also be used to move articles while upright, invert them, and then restore them to upright position.

The drawings illustrate the latter use of the conveyor and, more particularly, show the conveyor operating to carry upright cans beneath a water jetting device which partially fills them with water to remove dust from their interior. When thus used, the conveyor next tilts and inverts the cans to swirl the water within them, the inverting action finally causing the water to drop from the cans. The conveyor then holds the cans inverted for a period long enough to enable all water to drain therefrom and finally restores them to upright position.

It is thought that the description of the construction of the apparatus in use for a jetting and draining operation will also make clear how the conveyor can be used for other purposes.

The apparatus of the present invention and its operation may be generally described as follows: Referring to Figure 2, containers or other articles C to be handled on the gripping conveyor or element 20 of the invention are moved toward conveyor 20 upon a straight line conveyor 21. A timing device 22 of spiral form places the incoming containers in pockets of an infeed dial 23 which rotates in time with the gripping conveyor 20. The gripping conveyor 20 is formed of a link chain which, as best shown in Figures 3 to 7, has a series of gripping devices 24 secured thereto. Each gripping device may be generally described as comprising a backing plate 25 secured to a link of chain 20, the plate 25 standing against a lateral face of the link. Each backing plate 25 carries a pair of movable plates 26 on its outer face, the plates 26 being normally held flat against backing plate 25 by springs or other resilient elements generally indicated by the numeral 27. Each movable plate 26 carries one or more forwardly projecting gripping arms 28 which are bent toward each other, as shown in Figure 4.

As is best illustrated in Figure 2, a gripping device operating chain or element 29 extends alongside a portion of a run of gripper conveyor 20, operating element 29 moving in a plane at right angles to the plane in which the gripping conveyor 20 moves. For example, in the illustrated embodiment, as is best shown in Figure 2, the gripping conveyor 20 lies and moves in a vertical plane, while the gripper operating element 29 lies and moves in a horizontal plane. The operating element 29 carries lugs 30 which, as best shown in Figure 7, are adapted to move through apertures in the backing plates 25 of the gripping conveyor 20 to swing the movable plates 26 apart and thereby spread the gripping arms 28. Figure 2 illustrates how the gripping arms 28 of the gripping device will be held open by lugs 30 of operating element 29 at a point opposite the infeed dial 23. The same figure also illustrates how the gripping arms 28 will be moved toward each other by the springs 27 to grip a container C immediately after a gripping device has moved away from the operating element 29.

As indicated above, in the illustrated embodiment of the invention, after upright containers C are received by the gripping conveyor 20, the latter moves the containers to the right in Figure 1 and beneath a jetting device designated by the numeral 31. The jetting device 31 includes a plurality of nozzles respectively adapted to move into alignment with the mouth of a can or other container to partially fill the latter with water. After a can has received water the gripping conveyor 20 will turn the can upside down so that the water will drop from the container. In this way, dust or other foreign matter within a can may be washed out before the can is filled.

The can will move along the bottom run of gripping conveyor 20 so as to thoroughly drain and will then be turned upright as shown at the left of Figure 1. The gripping device 24 will then move adjacent the gripper operating element 29 which will open device 24 so that the container will be free for removal by the outfeed dial 32. The latter will replace the container on straight-line conveyor 21.

In more detail, when the conveyor of the invention is used with a jetting device, the supporting or base portion of the apparatus will include a series of standards 40 (Figure 1) which support horizontal members, for example, vertically spaced tubes 41 carrying journal supports 42 (Figure 9) in which shafts 43 carrying large sprocket wheels 44 are journaled. One of the shafts 43 is driven by a motor through connections not shown, and the other shaft 43 is an idler. The sprockets 44 carry the gripping conveyor or element 20 formed of a plurality of links 45. As is indicated in Figure 9, certain of the links, equi-distantly spaced, are pivotally joined by pins or studs 46 which, as shown in Figure 6, secure the backing plates 25 of the gripping devices 24 to the gripping conveyor 20.

Figure 3 shows a backing plate 25 in front elevation and it will be observed from this view that the plate is of generally rectangular formation but may have its corners bevelled as indicated at 47 so that it may readily enter between upper and lower grooved guides 48 suitably supported upon the base portion of the machine. The grooved guides 48 are ordinarily only provided along such portion of the run of conveyor 20 as moves opposite the gripper operating chain 29. That is, the purpose of the guides 48 is simply to hold the gripping elements 24 in the desired plane while they are being operated by the operating chain 29. As indicated in Figures 2 and 8, a supporting plate 49 is provided beneath the portion of the run of gripping conveyor 20 at which articles are presented to or removed from the gripping devices. For example, in the present embodiment, the supporting plate 49 extends beneath the infeed and outfeed dials 23 and 32 to support containers C while moving with the dials and during the time that the containers are not actually gripped and held by the gripping devices 24.

Each backing plate 25 is provided with vertically angled ears 50 at the upper and lower portions of its side edges, which ears serve as fulcrum or pivot points for the movable plates 26 as hereinafter explained.

As is best shown in Figure 6, the two movable plates 26 of each gripping device 24 are urged to a position flat against the backing plate 25, i. e., to lie alongside each other in a single plane, by springs 27 mounted upon studs 51 threaded in the backing plate 25 and extending through slots 52 (Figure 5) in the movable plates. The inner ends of the springs 51 bear upon the outer surfaces of the movable plates 26 near their abutting edges, while the outer ends of the springs bear upon washers backed by cushion members 53 which extend past the outer end of each stud 51. Two springs are ordinarily provided for each movable plate 26, and as illustrated in Figure 3, the springs associated with each plate 26 are vertically spaced.

Adjacent their outer edges the movable plates 26 are provided with threaded apertures which receive the inner ends of the gripping arms 28. It is found desirable to equip one backing plate of a pair with two gripping arms 28, one extending from the extreme upper and lower portions of the plate, while the other movable plate is provided with a single gripping arm positioned intermediate the gripping arms of the coacting movable plate. The outer ends of the gripping arms are bent toward each other, as illustrated in Figure 4, so that the article gripped by the arms will be partially encircled and pressed in against the stops 53 in the manner shown in Figure 4. The ends of the arms are preferably covered or faced with a cushioning material.

It will be noted from Figure 3 that the stops 53 associated with one plate 26 are vertically offset with respect to those of the other plate 26. This arrangement, in conjunction with the use of vertically offset gripping arms 28, enables the gripping devices to handle articles of different heights. For example, an article only tall enough to contact with the lower left-hand stop 53 of Figure 3 would be contacted by one arm 28 and pressed against that stop 53 and the lower right-hand stop 53 so as to be firmly held in the desired position. The fact that the gripping devices can handle articles of greatly varying diameters will be clear from Figure 7. Because of these factors, the conveyor 20 can handle articles of numerous sizes and shapes with no adjustments whatever.

The gripper operating element 29 is preferably formed of a link chain which moves about sprocket wheels 55 in the manner shown in Figure 2. It will be observed that the chain 29 moves in a plane normal to the plane in which the gripping conveyor 20 moves. The vertical shafts 56 which carry the sprocket wheels 55 are journalled in a casting 57, best shown in Figure 10, and casting 57 also supports a small sprocket 58 about which the sprocket chain 29 moves. The small sprocket 58 is carried by a stud 59 which is adjustable toward and from the adjacent large sprocket 55 so as to serve as a take-up element. As best shown in Figure 2, the supporting casting 57 is mounted upon a rod 60 threadedly secured to ears 61 of the base or frame of the machine so that the position of gripper operating element 29 may be adjusted longitudinally of the path of movement of the conveyor 20.

Gripper operating element 29 has certain of its links provided with outwardly projecting rounded lugs 30 which are spaced by a distance corresponding to the distance between the centers of the grippers 24 on conveyor 20. Referring to Figure 2, it will be noted that the lugs 30 are adapted to project into slots 60 (Figure 7) in the backing plates 25 of the gripping devices 24 to engage the rear faces of the abutting portions of the movable plates 26 so as to turn the plates away from each other in the manner shown in Figure 7. As also shown in Figures 3 and 4, hardened ball members 61 may be mounted in peened recesses in the plates 26 and with which the lugs may contact. The outer edges of the movable plates 26 will rock upon the ears 50 at the side edges of the backing plates and against the pressure of the springs 27. As is shown at the right-hand portion of Figure 2, after an operating lug 30 has moved out of contact with a gripping device 15, the springs 27 of that gripping device will urge the movable plates toward the backing plate to bring the gripping arms 28 into engagement with the outer portion of an article and hold it against the cushion members 53.

The gripper operating element 29 is driven solely by the engagement of its lugs 30 with the slots 60 in the backing plates 25. This arrangement insures that the gripping conveyor and the gripper operating element will move at the same speed.

It is necessary that an infeed dial such as 23 and an outfeed dial such as 32 be driven in exact synchronism with the gripper conveyor 20. However, if the gripper conveyor 20 is relatively long and a dial is positioned intermediate its length and driven through rigid shafting from the same point at which the conveyor is driven, any stretching or slackening of the conveyor 20 would result in the dial being out of synchronism with the portion of the conveyor moving adjacent the dial. For this reason, it is desirable to drive an infeed or outfeed dial from the portion of the conveyor 20 immediately adjacent the dial. An arrangement for driving a dial or similar mechanism in this manner is illustrated in Figures 9 to 11.

Referring to Figure 9, a large sprocket wheel 62, suitably journalled in the stationary frame, engages the upper run of gripping conveyor 20 at a point adjacent the dial 23 as indicated in Figure 1. The shaft 63 which carries sprocket 62 also carries a pinion 64 which is geared, through an intermediate pinion, with a pinion 65, keyed to a sleeve or hollow shaft element 66, journalled in the frame of the machine. Sleeve 66 has a plate 67 keyed to its outer end and, as best shown in Figure 11, plate 67 is provided with two trunnions 68 in which a short shaft 69 carrying a worm gear 70 is journalled. Worm gear 70 engages a worm wheel 72 which has a rotatable fit on a stub shaft 73 which extends back through the hollow shaft 66. Stub shaft 73 has a pin 74 extending diametrically therethrough outwardly of worm wheel 72. A housing 75 is secured to the plate 67 and this housing carries a spring 76 which bears on a ring 77 freely mounted on the outer end of shaft 73. The inner face of ring 77 bears against pin 74 to thereby hold stub shaft 73 inwardly or to the left in Figure 10. In such position, the ends of pin 74 will engage diametrically spaced notches 78 in the hub 72a of worm wheel 72. Obviously, so long as the ends of pin 74 are held in the notches 78, stub shaft 73 will be rotated with the worm wheel 72.

It will be noted that the engagement of the worm gear 70 with the worm wheel 72 is simply a key or locked connection serving to cause worm wheel 72 to rotate with plate 67. That is, worm gear 70 does not normally turn on its own axis to drive worm wheel 72 but revolves around the axis of worm wheel 72.

Stub shaft 73 has a collar 80 secured to its inner end by a pin 81 and collar 80 is keyed to an aligned stub shaft 82. Stub shaft 82 carries a bevel gear 83 at its inner end which meshes with a bevel gear 84 carried at the lower end of the shaft 85 which carries the infeed dial 23. The spiral timing device 22 is driven from the stub shaft 82 through an extension 86 and a train of gears generally indicated by the numeral 87.

Figure 1 of the drawings diagrammatically shows in dotted lines the point lengthwise of the conveyor 20 on which the axis of the stub shaft 73 lies. As is clear from Figure 10, the axis of the dial shaft 85 lies on this same line. It will be observed from Figure 1 that the axis of the sprocket 62 from which stub shaft 73 and the dial shaft are driven, is spaced from the axis of the dial shaft by a relatively short distance which depends solely upon the space required for the train of gears including the pinions 64 and 65. It will be clear from this that the dial shaft 85 will rotate exactly in synchronism with the adjacent portion of the gripping conveyor 20 because it is driven from that portion.

The outfeed dial 32 will be driven from the gripping conveyor 20 by a mechanism identical with that disclosed in Figure 10 and described above, except that this mechanism will not require the extension shaft 86 and the train of gears 87 to drive a spiral timing device 22.

In the event that a can or other article becomes jammed adjacent the timing device 22 or the infeed dial 23 or at the moment of its transfer from dial 23 to a gripping device 24, the rotation of the timing device or dial will be impeded. This will prevent the free rotation of the stub shaft 73, with the result that worm wheel 72, driven from gripping conveyor 20, will rotate on stub shaft 73 to carry the bevelled notches 78 in its hub 72a from beneath the pin 74 fixed to shaft 73. The action of worm wheel hub 72a in running past pin 74 will force pin 74 and stub shaft 73 to the right in Figure 10 against the action of the spring 76. The collar 80 pinned to stub shaft 73 will likewise move to the right and along the second stub shaft 82. Such movement of collar 80 will cause the flange 88 on the collar to operate a switch 89 to stop the driving motor of the apparatus.

As is shown in Figure 11, the end of the short shaft 69 mounted on plate 67 is socketed to receive an operating handle. When the worm wheel 72 moves past pin 74 in the manner described above, it will be necessary to apply an operating handle to the shaft 69 to manually rotate worm gear 70 on its own axis to return the worm wheel 72 to normal position, i. e., with its hub notch 78 beneath pin 74, thereby re-establishing the proper timing of the driving mechanism.

The outfeed dial 32 would be restored to normal position with respect to conveyor 20 in the same manner as has been described above in connection with the Figure 10 structure.

The description set forth above as to the manner in which the gripping conveyor 20 and the gripper operating element 29 cooperate will make it clear that these elements can be used together as described at any point along a gripper conveyor 20. That is, if it is desired to move cans from the lower story of a plant to an upper story to be filled, and then return them to the lower story, a run of the conveyor 20 on the lower story would have an infeed dial 23 and an outfeed dial 32 associated therewith, together with an operating element 29. Cans could thereby be placed on the gripping conveyor 20 by the infeed dial 23 and the gripping conveyor would move them to the upper story. At this point a run of gripper conveyor 20 could be provided with another infeed and outfeed dial and operating element 29. The outfeed dial on the upper story would remove cans from conveyor 20 in conjunction with operating element 29 and the cans could be moved to a filling machine. After filling they would move to the infeed dial of the upper story and would be placed upon the return run of conveyor 20 to be taken down to the outfeed dial of the lower story. In other words, the single conveyor element 20 with two operating elements 29 at the proper points can be used as a conveyor to carry articles upwardly and then return them downwardly, thereby replacing an endless conveyor of the drag type and a chute such as have been heretofore used to respectively perform the lifting and downward conveying functions.

As shown in Figure 10, a pair of split hanger brackets 95 and 96 support the dial driving mechanism including sprocket 62 and dial 23 or dial 32, the brackets 95 and 96 being suitably clamped about the horizontally extending tubes 41. By slightly loosening the clamping means of the brackets 95 and 96, the latter can be moved lengthwise of the run of gripper conveyor 20 to make such corrections as may be necessary with regard to the position of a dial with respect to the gripper conveyor.

The spiraled timing device 22 is of the type described in my application for Article weighing and handling apparatus, Serial No. 438,163, filed April 8, 1942.

The terminology used in the specification is for the purpose of description and not of illustration, the scope of the invention being indicated by the claims.

I claim:

1. In an article gripping means for conveyors, a plate adapted to be secured to the conveyor, a pair of plates positioned on one face of said fixed plate for pivotal movement with respect to the latter, each of said pivoted plates having a gripping arm extending outwardly therefrom, the ends of the arms being bent toward each other, studs extending from said fixed plate and through apertures in the pivoted plates, the outer ends of said studs serving as stops against which articles will be pressed by said gripping arms, and resilient means between said movable plates and the outer ends of said studs to urge said movable plates against said fixed plate.

2. In an article gripping means for conveyors, a plate adapted to be secured to the conveyor, a pair of plates positioned on one face of said fixed plate for pivotal movement with respect to the latter, each of said pivoted plates having a gripping arm extending outwardly therefrom, the ends of the arms being bent toward each other, studs extending from said fixed plate and through apertures in the pivoted plates, the outer ends of said studs serving as stops against which articles will be pressed by said gripping arms, and resilient means between said movable plates and the outer ends of said studs to urge said movable plates against said fixed plate, said fixed plate having forwardly projecting ears at its lateral edges on which said movable plates may pivot.

3. In an article handling apparatus, a moving element, a plate fixed on said element, a pair of plates movably carried by said fixed plate, resilient means to normally urge said movable plates to lie parallel with said fixed plate, gripping arms carried by said movable plates, and means moving with said element to contact said movable plates to position them at an angle to said fixed plate and thereby move said gripping arms apart.

4. In an article handling apparatus, a moving element, a plate fixed on said element, a pair of plates movably carried by said fixed plate, resilient means to normally urge said movable plates to lie parallel with said fixed plate, gripping arms carried by said movable plates, said fixed plate having an aperture therein, and means to enter the aperture in said fixed plate and contact said movable plates to swing them at an angle to each other to thereby spread said gripping arms.

5. In an article handling apparatus, a moving element, a plate fixed on said element, a plate movably carried by said fixed plate, an article gripping element projecting from one face of said fixed plate and past said movable plate, an article engaging element projecting outwardly from one face of said movable plate to be opposite said first-named gripping element, means to urge said movable plate to a position parallel to said fixed plate and in which its gripping element is spaced a predetermined distance from said other gripping element, and means movable in a direction substantially at right angles to said fixed plate to move said movable plate so that the gripping elements of the two plates will be spread further apart.

6. An article handling apparatus of the character described in claim 5 wherein the movable plate moving means is carried by an element moving with said moving element.

7. An article handling apparatus of the character described in claim 5 wherein said fixed plate has an aperture therein and said movable element moving means moves through the aperture.

8. In an article handling apparatus, a moving element, a plate fixed on said element, a pair of plates movably carried by said fixed plate, means to urge said movable plates to lie parallel with said fixed plate and with their opposed edges in a predetermined spaced relationship, gripping arms carried by said movable plates, and means movable in a direction substantially at right angles to said first plate to move the opposed edges of said movable plates further apart and thereby spread apart said gripping arms.

9. An article handling apparatus of the character described in claim 8 wherein the movable plate moving means is carried by an element moving with said element.

10. An article handling apparatus of the character described in claim 8 wherein said fixed plate has an aperture therein and said movable element moving means moves through the aperture.

11. In an article handling apparatus, a moving element, a plate fixed on said element, a plate pivotally carried by said fixed plate, an article gripping element projecting from said fixed plate and past said movable plate, an article engaging element projecting outwardly from said movable plate to be opposite said first-named gripping element, means to urge said pivoted plate to a position parallel to said fixed plate, said fixed plate having an aperture therein, and means movable in a direction substantially at right angles to said fixed plate and through the aperture in the latter to swing said pivoted plate with respect to the fixed plate so that the gripping elements of the two plates will be spread further apart.

12. In an article handling apparatus, a moving element, a plate fixed on said element, a pair of plates pivotally mounted on said fixed plate, means to urge said pivoted plates to a position parallel with said fixed plate, gripping arms carried by said pivoted plates, and means movable in a direction substantially at right angles to said first plate to swing said pivoted plates upon the latter and thereby spread apart said gripping arms.

13. An article handling apparatus of the character described in claim 12 wherein the means to move the pivoted plate is carried by an element moving with said moving element.

14. An article handling apparatus of the character described in claim 12 wherein said fixed plate has an aperture therein and the means to move said pivoted plate moves through the aperture.

15. In an article gripping means for conveyors, a plate adapted to be secured to the conveyor, a plate positioned on one face of said fixed plate for pivotal movement with respect to the latter, said pivoted plate having a gripping element extending outwardly therefrom, a stud extending from said fixed plate and through an aperture in the pivoted plate, the outer end of said stud serving as a stop against which articles will be pressed by said gripping element, and resilient means between said movable plate and the outer end of said stud to urge said movable plate against said fixed plate.

16. In an article handling apparatus, a moving element, a plate fixed on said element, a plate movably carried by said fixed plate, resilient means to normally urge said movable plate to lie parallel with said fixed plate, a gripping element carried by said movable plate, and means moving with said element to contact said movable plate to position it at an angle to said fixed plate and thereby move said gripping element away from said fixed plate.

EDWIN ROLKER.